United States Patent
Hatta

(10) Patent No.: US 7,641,453 B2
(45) Date of Patent: Jan. 5, 2010

(54) PULSATION REDUCING APPARATUS AND INSPECTION APPARATUS

(75) Inventor: Masataka Hatta, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 272 days.

(21) Appl. No.: 11/488,134

(22) Filed: Jul. 18, 2006

(65) Prior Publication Data

US 2007/0031274 A1 Feb. 8, 2007

(30) Foreign Application Priority Data

Jul. 19, 2005 (JP) ............................. 2005-208292
Apr. 25, 2006 (JP) ............................. 2006-120592

(51) Int. Cl.
*F04B 11/00* (2006.01)

(52) U.S. Cl. .................................. 417/540; 137/565.34

(58) Field of Classification Search ................. 417/540, 417/542, 543, 385, 541; 138/26, 30; 303/85, 303/87; 137/386, 395, 393, 454, 571, 587, 137/565.34; 248/566, 636, 631; 91/436
See application file for complete search history.

(56) References Cited

U.S. PATENT DOCUMENTS

| | | | | |
|---|---|---|---|---|
| 1,767,100 A | * | 6/1930 | Tannehill | 417/543 |
| 2,362,586 A | * | 11/1944 | Ruth | 137/211.5 |
| 2,712,831 A | * | 7/1955 | Day | 138/26 |
| 2,773,455 A | * | 12/1956 | Mercier | 417/540 |
| 4,562,036 A | * | 12/1985 | Shin et al. | 376/283 |
| 5,084,671 A | * | 1/1992 | Miyata et al. | 324/760 |
| 5,105,147 A | * | 4/1992 | Karasikov et al. | 324/537 |
| 5,671,603 A | * | 9/1997 | McCorkle et al. | 62/49.2 |
| 5,997,693 A | * | 12/1999 | Hirooka et al. | 162/336 |
| 6,113,056 A | * | 9/2000 | Armstrong | 248/562 |
| 6,767,188 B2 | * | 7/2004 | Vrane et al. | 417/40 |
| 6,906,546 B2 | * | 6/2005 | Tanioka et al. | 324/765 |

FOREIGN PATENT DOCUMENTS

| | | |
|---|---|---|
| JP | 51-54304 | 4/1976 |
| JP | 10-173013 | 6/1998 |

\* cited by examiner

*Primary Examiner*—Devon C Kramer
*Assistant Examiner*—Amene S Bayou
(74) *Attorney, Agent, or Firm*—Oblon, Spivak, McClelland, Maier & Neustadt, L.L.P.

(57) ABSTRACT

A pulsation reducing apparatus is used for an apparatus having a pump for circulating a liquid in a circulating line and a tank for storing the liquid circulating via the pump. The pulsation reducing apparatus includes a supplement tank for reserving the liquid such that a liquid surface height of the supplement tank is higher than that of the tank. The tank is connected to the supplement tank and the empty space portion of the tank is connected to the supplement tank via a gas exhaust line. When the empty space portion of the tank communicates with that of the supplement tank via the gas exhaust line due to a reduction of the liquid in the tank, the gas in the tank is exhausted to the empty space portion of the supplement tank via the gas exhaust line and the liquid in the supplement tank is supplemented into the tank.

20 Claims, 3 Drawing Sheets

PULSATION REDUCING APPARATUS AND INSPECTION APPARATUS

FIELD OF THE INVENTION

The present invention relates to a pulsation reducing apparatus and an inspection apparatus; and, more particularly, to a pulsation reducing apparatus for reducing a vibration of a mounting table, the vibration being caused by a pulsation in circulating liquid such as a heat transfer medium or the like in the mounting table with the use of a pump, for example, and an inspection apparatus having the pulsation reducing apparatus.

BACKGROUND OF THE INVENTION

As for a conventional pulsation reducing apparatus, there have been utilized a diaphragm type, a bladder type and a bellows type apparatus or the like. However, such apparatuses are set to be kept at high initial set pressure values and operate ineffectively in a low or a negative pressure range. Further, the aforementioned apparatuses have high spring constants for dampening pulsation and are unable to dampen any minute pulsation. Furthermore, in terms of a material strength, none of them is usable in a low temperature range of, e.g., minus several tens degree. In addition, in case of a gas pressurization-typed pulsation reducing apparatus, it is difficult to uniformly maintain a liquid surface height in a tank due to a dissolution of sealed gas in liquid, a separation of gas from liquid, e.g., a vaporization of liquid or dissolved gas and a pressure change of circulating liquid or the like.

Japanese Utility Model Laid-open No. H6-403383 discloses therein a water level controller of an air chamber, for reducing a pulsation in a quite different manner from those of the aforementioned apparatuses. In such water level controller of the air chamber, the inconvenience for supplementing air is reduced by lengthening intervals for supplementing air in the air chamber with a reciprocating pump, to thereby reduce a labor associated with such operation and maintain a stable operation for a long period of time.

Further, in case of such controller, an air chamber such as an air inlet chamber where air is sealed or the like is employed as a main chamber. The main chamber is provided with a water level control pipe through which liquid of the chamber is overflowed to be discharged to thereby control the level of the height of the liquid, wherein the water level control pipe is connected to an auxiliary chamber where air is sealed. Initially, the liquid does not overflow from the water level control pipe and, also, a pulsation reducing function, a cushioning function and a volume compensating function are normally performed. However, when the air is dissolved into the liquid to increase the water level, the liquid overflows through the water level control pipe into the auxiliary chamber. Thus, an air as much as the liquid is pressed and supplemented substitutively into the main chamber, thereby ensuring a minimum air volume required for a long period of time.

Meanwhile, in case of the pulsation reducing apparatus disclosed in Utility Model Laid-open No. H6-403383, the main chamber is positioned higher than the auxiliary chamber in a positive pressure line of a discharging side of the pump. Accordingly, liquid increased by air dissolved in the main chamber overflows into the auxiliary chamber and, then, the liquid decreased by the overflow is substituted with air in the auxiliary chamber. As a result, a pressure increase in the main chamber, which is caused by the vaporization of liquid or the like, is not considered.

However, in case a target object is cooled on a mounting table and then maintained at a uniform temperature during an inspection using the inspection apparatus for the target object such as, e.g., a semiconductor wafer or the like, a coolant circulating in the mounting table is easily vaporized in the main chamber. Further, since a vaporization volume of liquid exceeds a dissolution volume of air into liquid, a gas pressure in the main chamber increases and, also, the pulsation reducing function deteriorates.

SUMMARY OF THE INVENTION

It is, therefore, an object of the present invention to provide a pulsation reducing apparatus capable of constantly and stably reducing a pulsation regardless of a vaporization of liquid and an inspection apparatus.

In accordance with a first aspect of the invention, there is provided a pulsation reducing apparatus for use in an apparatus having a pump for circulating a liquid in a circulating line and a tank for storing the liquid circulating via the pump, the pulsation reducing apparatus serving to reduce a pulsation of the liquid by the pump by using a gas in an empty space portion above a liquid surface in a tank as a buffer. The pulsation reducing apparatus includes a supplement tank for reserving the liquid such that a liquid surface height of the supplement tank is higher than that of the tank. In the pulsation reducing apparatus, the tank is connected to a supplement tank and the empty space portion of the tank is connected to the supplement tank via a gas exhaust line. In addition, when the empty space portion of the tank communicates with that of the supplement tank via the gas exhaust line due to a reduction of the liquid in the tank, the gas in the tank is exhausted to the empty space portion of the supplement tank via the gas exhaust line and liquid in the supplement tank is supplemented into the tank.

It is preferable that the tank and the supplement tank are provided at an absorbing side of the pump.

Moreover, it is preferable that the apparatus further includes a relief valve for opening the empty space portion of the supplement tank to an atmosphere by using a gas pressure therein.

In accordance with a second aspect of the present invention, there is provided a pulsation reducing apparatus for use in an apparatus having a pump for circulating a liquid in a circulating line and a tank for storing the liquid circulating via the pump, the pulsation reducing apparatus serving to reduce a pulsation of the liquid by the pump by using a gas in an empty space portion above a liquid surface in a tank as a buffer. The pulsation reducing apparatus includes a first liquid surface sensor for sensing a maximum height of the liquid surface of liquid in the tank; and a second liquid surface sensor for sensing a minimum height of the liquid surface of liquid in the tank. In the pulsation reducing apparatus, a liquid surface height in the tank is controlled within a specific range based on detection signals from the first and the second liquid surface sensor.

It is preferable that the pulsation reducing apparatus further includes a first valve for introducing a gas into the tank based on the detection signal from the first liquid surface sensor and a second valve for exhausting gas from the tank based on the detection signal from the second liquid surface sensor.

Moreover, it is preferable that the apparatus further includes a control apparatus for opening/closing the first and the second valve based on the detection signals from the first and the second liquid surface sensor.

In addition, it is preferable that the liquid is a heat transfer medium whose vapor pressure is greater than a pressute difference created by a liquid surface height difference between the tank and the supplement tank.

In accordance with a third aspect of the present invention, there is provided an inspection apparatus having a mounting table for mounting thereon a target object, a pump for circulating a liquid in the mounting table and a tank for storing the liquid circulating via the pump. The apparatus serves to inspect the target object on the mounting table and further includes one or more pulsation reducing apparatuses to reduce a pulsation of the liquid by the pump by using a gas in an empty space portion above a liquid surface in the tank as a buffer.

It is preferable that the pulsation reducing apparatuses have the pulsation reducing apparatus disclosed in the first aspect of the present invention and/or the pulsation reducing apparatus disclosed in the second aspect of the present invention.

Moreover, it is preferable that the liquid is a heat transfer medium whose vapor pressure is greater than a pressure difference created by a liquid surface height difference between the tank and the supplement tank.

In accordance with a forth aspect of the present invention, there is provided an inspection apparatus having a mounting table for mounting thereon an target object, a pump for circulating a liquid in the mounting table and a tank for storing the liquid circulating via the pump. The apparatus serves to inspect the target object on the mounting table and further includes a pulsation reducing apparatus at least at a liquid absorbing side of the pump to reduce a pulsation of the liquid by the pump.

It is preferable that the inspection apparatus further includes one or more pulsation reducing apparatuses for reducing pulsation of the liquid by the pump by using a gas in an empty space portion above a liquid surface in the tank as a buffer.

Moreover, it is preferable that the inspection apparatus includes the pulsation reducing apparatus disclosed in the first aspect of the present invention and/or the pulsation reducing apparatus disclosed in the second aspect of the present invention.

In addition, it is preferable that the liquid is a heat transfer medium whose vapor pressure is greater than a pressure difference created by a liquid surface height difference between the tank and the supplement tank.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENT

Figure 1:
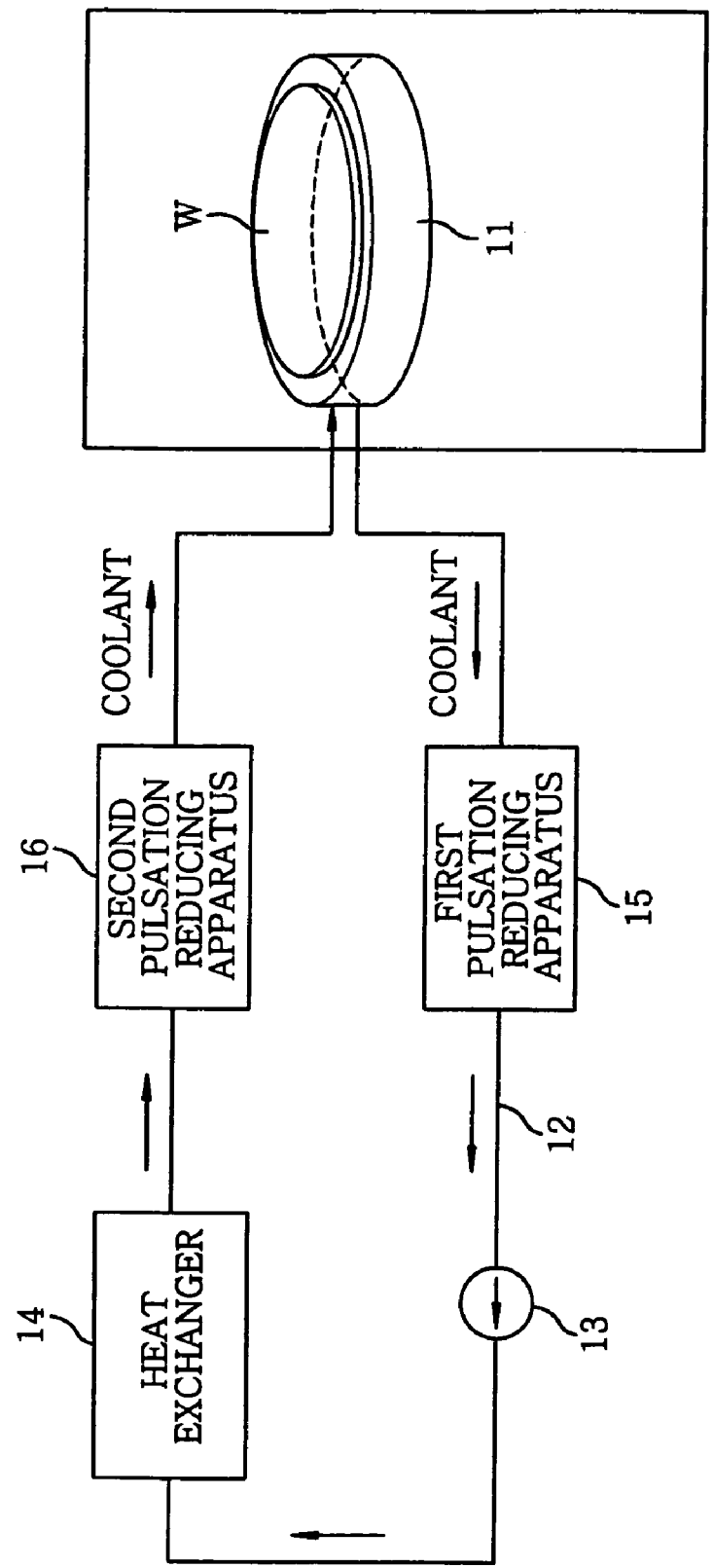
FIG. 1 shows a schematic block diagram of an inspection apparatus employing a pulsation reducing apparatus of the present invention.
Figure 2:
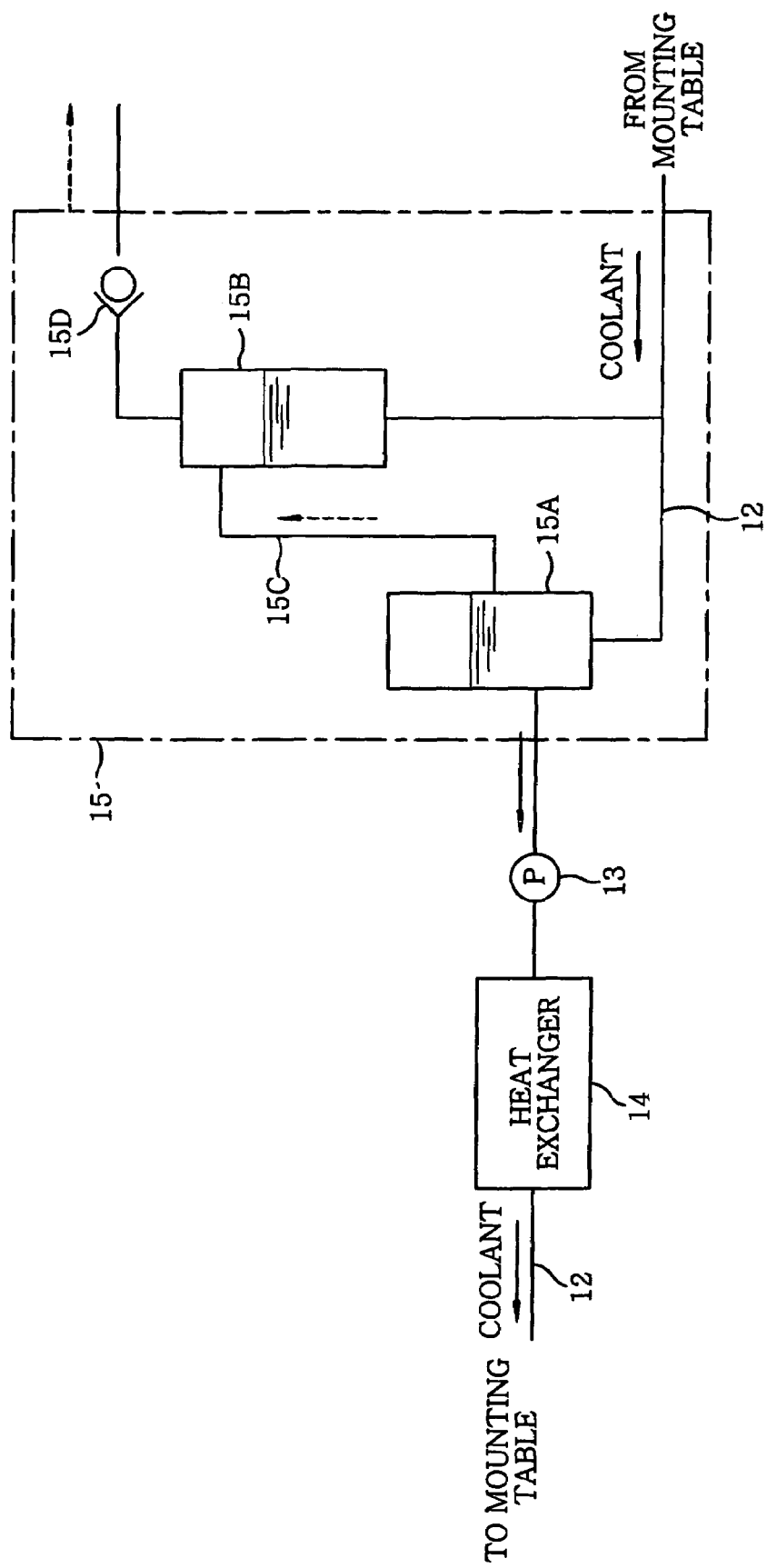
FIG. 2 describes a composition of a first pulsation reducing apparatus of the inspection apparatus depicted in FIG. 1.
Figure 3:
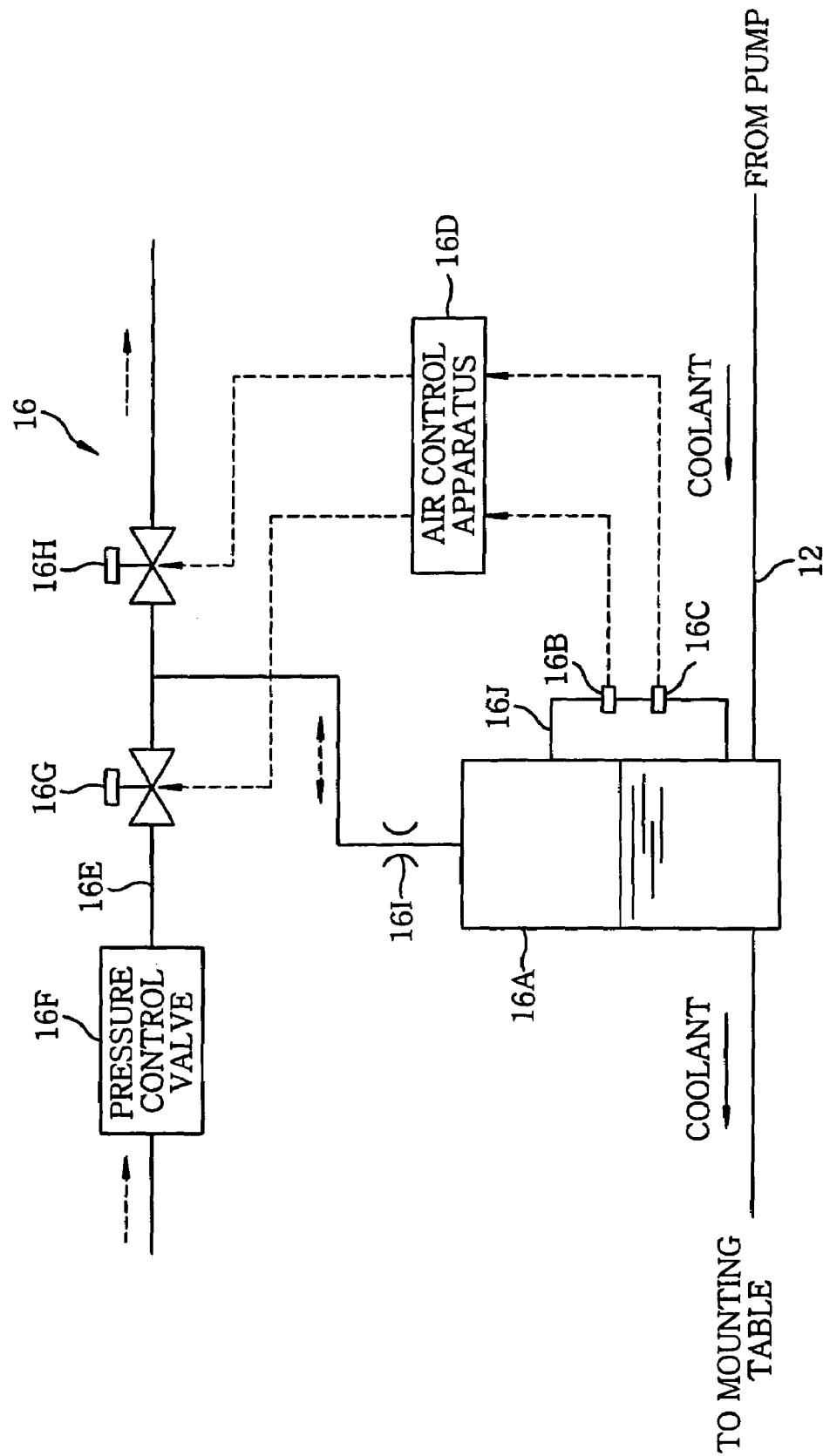
FIG. 3 provides a composition of a second pulsation reducing apparatus of the inspection apparatus shown in FIG. 1.

Hereinafter, the present invention will be described in accordance with preferred embodiments shown in FIGS. 1 to 3. FIG. 1 shows a schematic block diagram of an inspection apparatus employing a pulsation reducing apparatus of the present invention; FIG. 2 describes a composition of a first pulsation reducing apparatus of the inspection apparatus depicted in FIG. 1; and FIG. 3 provides a composition of a second pulsation reducing apparatus of the inspection apparatus shown in FIG. 1. In each of the drawings, arrows indicated by solid lines and dashed lines represent a coolant flow and a gas flow, respectively.

As shown in FIG. 1, an inspection apparatus 10 of this embodiment includes a mounting table 11 for mounting thereon a target object (e.g., a semiconductor wafer W) and a pump 13 connected to the mounting table 11 via a circulation line 12 for supplying and circulating a coolant in the mounting table 11. In addition, the apparatus includes a heat exchanger 14 for cooling the coolant supplied thereto after being circulated through the mounting table 11 and the circulation line 12 via the pump 13 such that the temperature thereof is raised to a higher temperature, to the original temperature. Further, the inspection apparatus 10 is configured to perform an electrical test on the semiconductor wafer W on the mounting table 11 by cooling and maintaining the wafer W at a predetermined temperature with the coolant. The mounting table 11 is designed to move horizontally and vertically during the inspection to make the semiconductor wafer W have a contact with a probe card (not illustrated).

The mounting table 11 is cooled by the coolant, so that the electrical test can be performed on the semiconductor wafer W at a proper temperature of, e.g., minus several tens degree. The coolant used herein may include fluorine-based nonreactive liquid, for example, fluorinert of Sumimoto 3M, Galden (registered trademark) of Solvay Solexis, Inc. or the like.

When the coolant is circulated by the pump 13, the mounting table 11 and the circulation line 12 tend to slightly vibrate due to the pulsation of the coolant. Since the vibration of the mounting table 11 affects a contact pressure between the semiconductor wafer W and the probe card, the inspection of the semiconductor wafer W can be interfered. The effect of the pulsation is so noticeably significant that a wiring layer or an insulating layer becomes thinned in a high-density integrated circuit formed on the semiconductor wafer W. Therefore, in this embodiment, in order to reduce the pulsation from the pump 13, the circulation line 12 is provided with a first and a second pulsation reducing apparatus 15 and 16. The first pulsation reducing apparatus 15 is positioned at a negative pressure side where the pump 13 absorbs the coolant, whereas the second pulsation reducing apparatus 16 is positioned at a positive pressure side where the pump 13 discharges the coolant.

As shown in FIG. 2, the first pulsation reducing apparatus 15 includes a first tank 15A provided in the circulation line 12, for storing and preserving a coolant while leaving an empty space portion and a supplement tank 15B connected to the circulation line 12 similarly to the first tank 15A connected thereto, for storing and preserving a supplementary coolant for the first tank 15A while leaving an empty space portion. Herein, a gas of an air or the like in the empty space portion of the first tank 15A is configured to function as a buffer for reducing a pulsation.

The supplement tank 15B is positioned such that its liquid surface becomes higher than that of the first tank 15A. As will be described later, in case the pressure in the empty space portion in the first tank 15A increases by the vaporization of the coolant therein so that the liquid surface thereof is lowered by the decrease in the liquid amount therein, the coolant is constantly supplemented from the second tank 15B to the first tank 15A so that the liquid surface of the coolant in the first tank 15A can be uniformly maintained.

The first tank 15A and the supplementary tank 15B are connected to each other via a gas exhaust line 15C. A connecting member between the first tank 15A and the gas exhaust line 15C is generally positioned at a coolant portion which is slightly lower than the empty space portion, whereas a connecting member between the supplementary tank 15B and the gas exhaust line 15C is always positioned at the empty space portion. Accordingly, the empty space portion of the first tank 15A and that of the supplementary tank 15B are ordinarily blocked from each other. However, when the liquid surface in the first tank 15A is lowered and reaches the connecting member between the first tank 15A and the gas exhaust line 15C due to the decrease of the liquid amount through the vaporization of the coolant therein and the increased pressure in the empty space portion, the empty space portion of the first tank 15A communicates with that of the supplement tank 15B. As a result, gas in the first tank 15A moves into the empty space portion of the supplementary tank 15B, thereby increasing the pressure in the empty space portion of the supplementary tank 15B.

A relief valve 15D, which is attached to the empty space portion of the supplement tank 15B, automatically opens the empty space portion to the atmosphere and then discharges the gas (containing the vaporized coolant) in the supplement tank 15B to the atmospheric side when the pressure in the supplement tank 15B becomes above a predetermined pressure (e.g., 0.1 Kg/cm$^2$G). Thereafter, if the pressure in the empty space portion of the supplement tank 15B decreases by the gas discharge, the relief valve 15D is automatically closed. At this time, since the supplement tank 15B is positioned higher than the first tank 15A, the coolant in the supplement tank 15B is supplemented into the first tank 15A due to a liquid pressure difference between the coolant in the first tank 15A and that in the supplement tank 15B. Then, if the liquid surface in the first tank 15A is restored to the original level, its connecting member with the gas exhaust line 15C is sealed, and accordingly, the empty space portion of the first tank 15A and that of the supplement tank 15B are blocked.

In the meantime, as shown in FIG. 3, the second pulsation reducing apparatus 16 includes: a second tank 16A provided in the circulation line 12, for storing and preserving a coolant while leaving an empty space portion; a first and a second liquid surface sensor 16B and 16C for sensing a liquid surface of the coolant in the second tank 16A; and an air control apparatus 16D operating based on detection signals from the sensors 16B and 16C, the air control apparatus 16D being electrically connected to the first and the second liquid surface sensor 16B and 16C. Herein, gas, e.g., air filling the empty space portion of the second tank 16A or the like, is configured to function as a buffer for reducing the pulsation.

An air line 16E is connected to the second tank 16A. Therefore, as will be described later, the dry air in the factory is introduced into the second tank 16A via the air line 16E and, simultaneously, a gas in the second tank 16A is discharged to outside. In other words, a pressure control valve 16F, a first valve 16G and a second valve 16H are provided in the air line 16E in that order from an upstream toward a downstream. The dry air whose pressure is controlled to be maintained at a predetermined level by the pressure control valve 16F is introduced into and discharged from the second tank 16A via the first and the second valve 16G and 16H. Further, a branch line for connecting the air line 16E and the second tank 16A is provided between the first and the second valve 16G and 16H. The branch line has an aperture 16I for restricting a flow rate of air flowing therethrough. Moreover, the first and the second valve 16G and 16H are connected electrically to the air control apparatus 16D, so that the valves are opened/closed under the control thereof.

When a liquid surface height in the second tank 16A reaches a maximum level, the first liquid surface sensor 16B senses the liquid surface and then transmits the detection signal to the air control apparatus 16D. The air control apparatus 16D opens the first valve 16G based on the detection signal from the first liquid surface sensor 16B, so that dry air is introduced into the second tank 16A via the air line 16E and the branch line. Therefore, since the second tank 16A is pressurized, the liquid surface of the coolant is lowered.

When the liquid surface in the second tank 16A is lowered and thus reaches a lower limit, the second liquid surface sensor 16C detects such liquid surface and then transmits the detection signal to the air control apparatus 16D. The air control apparatus 16D opens the second valve 16H based on the detection signal from the second liquid surface sensor 16C, so that the gas in the second tank 16A is discharged via the air line 16E and the branch line. Accordingly, the second tank 16A is depressurized, and the liquid surface of the coolant increases.

Likewise, the air control apparatus 16D opens/closes the first and the second valve 16G and 16H based on the detection signals from the first and the second liquid surface sensor 16B and 16C and also uniformly maintains a gas pressure in the empty space portion of the second tank 16A. Consequently, the liquid surface height of the coolant is uniformly maintained. Further, the first and the second liquid surface sensor 16B and 16C are installed in a connection line 16J for connecting the coolant portion and the empty space portion in the second tank 16A.

Hereinafter, an inspection operation will be described. When the semiconductor wafer W is inspected, the pump 13 is driven to circulate a coolant in the mounting table 11 at a uniform flow rate, thereby cooling the mounting table 11. By cooling the mounting table 11, the semiconductor wafer W thereon is cooled regardless of heat generated during the inspection and also maintained at a predetermined temperature. When the pump 13 absorbs or discharges the coolant, the coolant pulsates. However, in this embodiment, the pulsation is reduced by the first and the second pulsation reducing apparatus 15 and 16. Accordingly, the vibration of the mounting table 11 and that of the circulation line 12 can be suppressed and prevented, resulting in an improved reliability of the inspection.

To be specific, if the pump 13 is driven to absorb the coolant, while the coolant passes through the first tank 15A of the first pulsation reducing apparatus 15, gas such as air in the empty space portion of the first tank 15A or the like functions as a buffer. Therefore, the pulsation of an absorbing side of the pump 13 is reduced. Meanwhile, if the pump 13 discharges the coolant, the coolant is cooled while passing through the heat exchanger 14 via the circulation line 12 and then passes through the second tank 16A of the second pulsation reducing apparatus 16. While the coolant passes through the second tank 16A, gas such as air in the empty space portion of the second tank 16A or the like functions as a buffer. Accordingly, the pulsation of a discharging side of the pump 13 is reduced.

Although the coolant pulsates when the pump 13 absorbs or discharges the coolant, the first and the second pulsation reducing apparatus 15 and 16 can reduce the pulsation of the absorbing and the discharging side, respectively. Accordingly, the vibration from the pulsation of the mounting table 11 and the circulation line 12 can be markedly suppressed or prevented. As a result, it is possible to improve the reliability of the inspection of the semiconductor wafer W.

However, as the inspection is performed, in the first pulsation reducing apparatus 15, the coolant is vaporized by effects of a negative pressure of a pump suction pressure in the first tank 15A. Accordingly, the coolant is gradually reduced and, at the same time, the pressure in the empty space portion increases, so that the liquid surface is lowered. When the liquid surface of the coolant in the first tank 15A is lowered and thus reaches the connecting member between the first tank 15A and the gas exhaust line 15C, the empty space portion of the first tank 15A communicates with that of the supplement tank 15B. Since a pressure in the empty space portion of the first tank 15A is higher than that in the empty space portion of the supplement tank 15B, gas in the first tank 15A moves into the empty space portion of the supplement tank 15B, thereby increasing the pressure in the empty space portion of the supplement tank 15B.

In the supplement tank 15B, the relief valve 15D operates, so that the empty space portion is opened to the atmosphere side. Accordingly, gas in the empty space portion is discharged and, at the same time, the coolant is supplemented into the first tank 15A. As the gas is discharged, the pressure in the empty space portion of the supplement tank 15B decreases, and the relief valve 15D is closed. Accordingly, the coolant in the supplement tank 15B is supplemented into the first tank 15A due to a height difference in the liquid surface between the coolant in the supplement tank 15B and that in the first tank 15A. In the first tank 15A, the liquid surface increases to the initial height of the liquid surface and, further, the connecting member between the first tank 15A and the gas exhaust line 15C is sealed. As a result, the supplement tank 15B is blocked, and the general pulsation reducing operation is maintained.

Further, on the contrary to the first pulsation reducing apparatus 15, in the second pulsation reducing apparatus 16, a gas is dissolved into the coolant by effects of a positive pressure of a pump discharge pressure in the second tank 16A and, thus, the liquid surface of the coolant in the second tank 16A is elevated. When the first liquid surface sensor 16B senses the liquid surface, the air control apparatus 16D opens the first valve 16G based on the detection signal from the first liquid surface sensor 16B. Thereafter a dry air is introduced into the second tank 16A via the air line 16E, so that the liquid surface is lowered. When the liquid surface is restored and, then, the detection signal from the first liquid surface sensor 16B becomes off, the air control apparatus 16D closes the first valve 16G and stops the introduction of dry air.

Besides, when the discharge amount of the pump 13 varies, the liquid surface height of the coolant in the second tank 16A varies. When the discharge amount increases, the liquid surface of the coolant in the second tank 16A is elevated. Thus, when the first liquid surface sensor 16B senses the increased liquid surface, the air control apparatus 16D opens the first valve 16G based on the detection signal from the first liquid surface sensor 16B. Accordingly, a dry air is introduced into the second tank 16A via the air line 16E, thereby lowering the liquid surface. When the liquid surface is restored and, then, the detection signal from the first liquid surface sensor 16B becomes off, the air control apparatus 16D closes the first valve 16G and stops the introduction of the dry air. On the contrary, in case the discharge amount decreases, the liquid surface is lowered. Consequently, the second-liquid surface sensor 16C is driven to open the second valve 16H via the air control apparatus 16D. As a result, the gas in the second tank 16A is exhausted, and the liquid surface is elevated.

As described above, in accordance with this embodiment, the first pulsation reducing apparatus 15 provided at the coolant absorbing side of the pump 13 includes: the first tank 15A for storing and preserving the coolant while leaving an empty space portion; the supplement tank 15B connected to the first tank 15A, being positioned at a higher position than the first tank 15A, for supplementing the coolant in the first tank 15A; and the gas exhaust line 15C for connecting the first tank 15A with the empty space portion of the supplement tank 15B. In case the pulsation of the coolant from the pump 13 is reduced by using gas in the empty space portion of the first tank 15A as a buffer, the coolant in the first tank 15A is reduced by the vaporization and, also, the pressure in the empty space portion increases, thereby lowering the liquid surface. Thereafter, when the empty space portion in the first tank 15A communicates with that in the supplement tank 15B via the gas exhaust line 15C, the gas in the first tank 15A is discharged to the empty space portion of the supplement tank 15B via the gas exhaust line 15C. At the same time, the coolant in the supplement tank 15B is supplemented into the first tank 15A based on the liquid pressure difference. Consequently, the gas in the first tank 15A is constantly maintained at a uniform pressure by the cooperation between the first tank 15A and the supplement tank 15B through the gas exhaust line 15C. As a result, the pulsation can be constantly and stably reduced.

When the empty space portion in the first tank 15A communicates with the empty space portion in the supplement tank 15B, the relief valve 15D opens the empty space portion of the supplement tank 15B to the atmosphere by using the gas pressure therein. Thus, the coolant in the supplement tank 15B is supplemented into the first tank 15A. As a result, it is possible to uniformly maintain the gas pressure in the empty space portion of the first tank 15A and also stably maintain the pulsation reducing operation.

Moreover, in accordance with this embodiment, the second pulsation reducing apparatus 16 provided at the coolant discharging side of the pump 13 includes: the second tank 16A for storing and preserving the coolant while leaving an empty space portion; the first liquid surface sensor 16B for sensing a maximum liquid surface of the coolant in the second tank 16A; and the second liquid surface sensor 16C for sensing a minimum liquid surface height of the coolant in the second tank 16A. The height of the liquid surface in the second tank 16A is controlled within a specific range based on the detection signals from the first and the second liquid surface sensor 16B and 16C. Therefore, in case the pulsation of the coolant from the pump 13 is reduced by using gas in the empty space portion on the liquid surface in the second tank 16A as a buffer, even if the liquid surface is elevated by gas dissolved in the coolant due to the positive pressure effects of the pump discharging pressure in the second tank 16A, the liquid surface height of the coolant in the second tank 16A can be uniformly maintained based on the detection signals from the first and the second liquid surface sensor 16B and 16C. Accordingly, the gas pressure in the empty space portion is uniformly maintained, thereby enabling to reduce the pulsation constantly and stably.

Furthermore, the gas pressure in the empty space portion of the second tank 16A can be more uniformly maintained with the help of the first valve 16G for introducing a dry air into the second tank 16A based on the detection signal from the first liquid surface sensor 16B, the second valve 16H for discharging the gas in the second tank 16A based on the detection signal from the second liquid surface sensor 16C and the air control apparatus 16D for opening/closing the first and the second valve 16G and 16H based on the detection signals from the first and the second liquid surface sensor 16B and 16C.

In addition, in accordance with this embodiment, since the first and the second pulsation reducing apparatus 15 and 16 are provided at the absorbing and the discharging side of the pump 13 in the coolant circulation line 12 of the inspection apparatus 10, respectively, the vibration of the mounting table 11 and the circulation line 12 can be suppressed or prevented. As a result, it is possible to improve the reliability of the inspection of the semiconductor water W.

Although there has been described a case where the inspection apparatus 10 is provided with the first and the second pulsation reducing apparatus 15 and 16 in this embodiment, the present invention is not limited thereto. The present invention can be applied to a semiconductor manufacturing device having a mounting table for controlling a temperature of a target object, e.g., a semiconductor wafer W or the like, or a liquid circulating circuit for circulating liquid such as a heat transfer medium or the like in the mounting table.

The present invention is suitable for a semiconductor manufacturing device, e.g., an inspection apparatus.

In accordance with the present invention, there can be provided a pulsation reducing apparatus capable of constantly and stably reducing a pulsation regardless of a vaporization of liquid as well as an inspection apparatus therefore.

While the invention has been shown and described with respect to the preferred embodiments, it will be understood by those skilled in the art that various changes and modification may be made without departing from the scope of the invention as defined in the following claims.

What is claimed is:

1. A pulsation reducing apparatus for use in an apparatus having a pump for circulating a liquid in a circulating line and a tank for storing the liquid circulating via the pump, the pulsation reducing apparatus serving to reduce a pulsation of the liquid by the pump by using a gas in an empty space portion above a liquid surface in the tank as a buffer, the pulsation reducing apparatus comprising:
a supplement tank for reserving the liquid such that a liquid surface height of the supplement tank is higher than that of the tank,
wherein an empty space portion of the supplemental tank is connected to the tank via a gas exhaust line, and
wherein when the empty space portion of the tank communicates with the empty space portion of the supplement tank via the gas exhaust line due to a reduction of the liquid in the tank, the gas in the tank is exhausted to the empty space portion of the supplement tank via the gas exhaust line and the liquid in the supplement tank is supplemented into the tank.

2. The apparatus of claim 1, wherein the tank and the supplement tank are provided at an absorbing side of the pump.

3. The apparatus of claim 1, further comprising a relief valve for opening the empty space portion of the supplement tank to an atmosphere by using a gas pressure therein.

4. The apparatus of claim 1, wherein the liquid is a heat transfer medium whose vapor pressure is greater than a pressure difference created by a liquid surface height difference between the tank and the supplement tank.

5. The apparatus of claim 2, wherein the liquid is a heat transfer medium that has a vapor pressure that is greater than a pressure difference created by a liquid surface height difference between the tank and the supplement tank.

6. An inspection apparatus comprising the pulsation reducing apparatus disclosed in claim 1.

7. The inspection apparatus of claim 6, further comprising a second pulsation reducing apparatus for use in the apparatus having the pump for circulating a liquid in the circulating line and a second tank for storing the liquid circulating via the pump, the pulsation reducing apparatus serving to reduce a pulsation of the liquid by the pump by using a gas in an empty space portion above a liquid surface in the second tank as a buffer, said second pulsation reducing apparatus including
a first liquid surface sensor for sensing a maximum height of the liquid surface of liquid in the second tank; and
a second liquid surface sensor for sensing a minimum height of the liquid surface of liquid in the second tank,
wherein a liquid surface height in the second tank is controlled within a specific range based on detection signals from the first and the second liquid surface sensors.

8. The inspection apparatus of claim 6, wherein the liquid whose vapor pressure is greater than a pressure difference created by a liquid surface height difference between the tank and the supplement tank is a heat transfer medium.

9. The inspection apparatus of claim 6 wherein the pulsation reducing apparatus is disposed at least at a liquid absorbing side of the pump to reduce the pulsation of the liquid by the pump.

10. The inspection apparatus of claim 9, further comprising a second pulsation reducing apparatus for use in the apparatus having the pump for circulating a liquid in the circulating line and a second tank for storing the liquid circulating via the pump, the pulsation reducing apparatus serving to reduce a pulsation of the liquid by the pump by using a gas in an empty space portion above a liquid surface in the second tank as a buffer, said second pulsation reducing apparatus including
a first liquid surface sensor for sensing a maximum height of the liquid surface of liquid in the second tank; and
a second liquid surface sensor for sensing a minimum height of the liquid surface of liquid in the second tank,
wherein a liquid surface height in the second tank is controlled within a specific range based on detection signals from the first and the second liquid surface sensors.

11. The inspection apparatus of claim 9, the liquid is a heat transfer medium whose vapor pressure is greater than a pressure difference created by a liquid surface height difference between the tank and the supplement tank.

12. The inspection apparatus of claim 6, further comprising:
a mounting table for mounting thereon a target object,
wherein the pump circulates the liquid in the mounting table.

13. The apparatus of claim 1, wherein a lower part of the tank is connected to a lower part of the supplement tank via a liquid supply line and the liquid in the supplement tank is supplemented into the tank via the liquid supply line.

14. The apparatus of claim 13, wherein the tank and the supplement tank are provided at an absorbing side of the pump.

15. The apparatus of claim 13, further comprising a relief valve for opening the empty space portion of the supplement tank to an atmosphere by using a gas pressure therein.

16. The apparatus of claim 13, wherein the liquid is a heat transfer medium that has a vapor pressure that is greater than a pressure difference created by a liquid surface height difference between the tank and the supplement tank.

17. The inspection apparatus of claim 6, wherein a lower part of the tank is connected to a lower part of the supplement tank via a liquid supply line and the liquid in the supplement tank is supplemented into the tank via the liquid supply line.

18. The apparatus of claim 17, wherein the tank and the supplement tank are provided at an absorbing side of the pump.

19. The apparatus of claim 17, wherein the pulsation reducing apparatus further comprising a relief valve for opening the empty space portion of the supplement tank to an atmosphere by using a gas pressure therein.

20. The apparatus of claim 17, wherein the liquid is a heat transfer medium that has a vapor pressure that is greater than a pressure difference created by a liquid surface height difference between the tank and the supplement tank.

* * * * *